(12) United States Patent
Cooper et al.

(10) Patent No.: US 8,352,348 B2
(45) Date of Patent: *Jan. 8, 2013

(54) GENERATING AND PROVIDING INFORMATION ABOUT EXPECTED FUTURE PRICES OF ASSETS

(75) Inventors: Philip A. Cooper, Weston, MA (US); Lisette Cooper, Weston, MA (US); Stewart Myers, Lexington, MA (US); G. David Forney, Jr., Cambridge, MA (US); Leonard L. Scott, Jr., Charlottesville, VA (US)

(73) Assignee: Athena Capital Advisors, Inc., Lincoln, MA (US)

( * ) Notice: Subject to any disclaimer, the term of this patent is extended or adjusted under 35 U.S.C. 154(b) by 94 days.

This patent is subject to a terminal disclaimer.

(21) Appl. No.: 13/088,124

(22) Filed: Apr. 15, 2011

(65) Prior Publication Data

US 2011/0231338 A1 Sep. 22, 2011

Related U.S. Application Data

(63) Continuation of application No. 12/139,669, filed on Jun. 16, 2008, now Pat. No. 7,930,232, which is a continuation of application No. 11/750,709, filed on May 18, 2007, now Pat. No. 7,555,454, which is a continuation of application No. 09/641,589, filed on Aug. 18, 2000, now Pat. No. 7,236,953.

(51) Int. Cl.
*G06Q 4/00* (2012.01)
(52) U.S. Cl. .................................................. 705/36 R
(58) Field of Classification Search .................. None
See application file for complete search history.

(56) References Cited

U.S. PATENT DOCUMENTS

| | | | |
|---|---|---|---|
| 5,148,365 A | 9/1992 | Dembo | |
| 6,021,397 A | 2/2000 | Jones et al. | |
| 6,061,662 A | 5/2000 | Makivic | |
| 6,263,321 B1 | 7/2001 | Daughtery, III | |
| 6,456,982 B1 | 9/2002 | Pilipovic | |
| 7,236,953 B1 | 6/2007 | Cooper et al. | |
| 7,555,454 B2 | 6/2009 | Cooper et al. | |
| 7,930,232 B2 | 4/2011 | Cooper et al. | |
| 2002/0065755 A1* | 5/2002 | Shlafman et al. | 705/36 |

OTHER PUBLICATIONS

B. Dumas, J. Fleming and R.E. Whaley, "Implied volatility functions: Empirical tests", *J. Finance*, vol. 53, pp. 2059-2106 (Dec. 1998).
Britten-Jones et al., "Option Prices, Implied Price Processes, and Stochastic Volatility", The Journal of Finance, vol. LV, No. 2, pp. 839-966, Apr. 2000.
D. T. Breeden and R. H. Litzenberger, "Prices of state-contingent claims implicit in option prices," *J. Business*, vol. 51, pp. 631-650 (1978).
http://valuengine.com/servlet/ValuationSummary, ValuEngine Inc., Jun. 28, 2001.
Hull, John C., "Options, Futures, and Other Derivatives" (Fourth Edition, 1999; Prentice-Hall).

(Continued)

*Primary Examiner* — Jason M Borlinghaus
(74) *Attorney, Agent, or Firm* — Fish & Richardson P.C.

(57) ABSTRACT

Data are received that represents current prices of options on a given asset. An estimate is derived from the data of a corresponding implied probability distribution of the price of the asset at a future time. Information about the probability distribution is made available within a time frame that is useful to investors, for example, promptly after the current option price information becomes available.

13 Claims, 9 Drawing Sheets

OTHER PUBLICATIONS

J. C. Jackwerth and M. Rubinstein, "Recovering probability distributions from option prices," *J. Finance*, vol. 51, pp. 1611-1631 (1996).

Makridakis et al., "Forecasting Methods and Applications". 3rd Edition. John Wiley & Sons. Danvers, MA. pp. 13-16 and 82 (1998).

Melick et al., "Recovering an Asset's Implied PDF from Option Prices: An Application to Crude Oil during the Gulf Crisis". Journal of Financial and Quantitative Analysis, vol. 32, No. 1, pp. 91-115, Mar. 1997.

Mendenhall et al., "A Brief Course in Business Statistics", Wadsworth Publishing Company, Belmont, CA 1995, p. 177.

Wadsworth, Harrison M., "The Handbook of Statistical Methods for Engineers & Scientists". 2nd Edition. McGraw-Hill. New York, NY. pp. 6.1-6.3, Dec. 1, 1997.

www.bloomberg.com, Bloomberg L.P., Jun. 27, 2001.

www.cbeo.com, Chicago Board Options Exchange, Jun. 14, 2000.

www.contingencyanalysis.com, Contigency Analysis, Jul. 20, 2000.

www.etrade.com, E*TRADE Securities, Inc., Jun. 27, 2001.

www.nyse.com, NYSE, Inc., Jun. 28, 2001.

www.optionetics.com, Global Investments Research Corp., Jun. 20, 2000.

www300.fidelity.com, Fidelity Investments Institutional Services Company, Inc., Jun. 27, 2001.

Nelson, Roger B., "Lecture Notes in Statistics: An Introduction to Copulas," copyright 1999.

Office action from Japanese Application No. 2002-521744, issued Aug. 22, 2011 (19 pages).

Shigenori Shiratsuka and Hisashi Nakamura, "Changes in Expectation Formation in the Financial Market," IMES (Institute for Monetary and Economic Studies) Discussion Paper Series 1998 (on line). Bank of Japan, Dec. 24, 1998, pp. 1-48.

Jens Carsten Jackwerth, Mark Rubinstein, "Recovering Probability Distributions from Option Prices," The Journal of Finance, Dec. 1996, vol. 51, No. 5, pp. 1611-1631.

Nobuyuki Oda and Toshinao Yoshiba, "Market Analysis Utilizing Market, Information Derivable from Derivative Product Prices," IMES Discussion Paper Series, 1997 (on line). Bank of Japan, Apr. 1, 1997, pp. 1-43.

Toshiaki Watanabe, Development of Volatility Models and Their Application to Stock-Return Data, Current Finance, Japan, Nippon Finance Association, MPT Forum, 1998, Mar. 31, 1998, pp. 15-41.

Bernard Dumas et al, "Implied Volatility Functions: Empirical Tests," The Journal of Finance, Dec. 1998, vol. 53, No. 6, pp. 2059-2106.

\* cited by examiner

GENERATING AND PROVIDING INFORMATION ABOUT EXPECTED FUTURE PRICES OF ASSETS

This application is a continuation of and claims the benefit of prior from U.S. application Ser. No. 12/139,669, filed Jun. 16, 2008, issuing on Apr. 19, 2011 as U.S. Pat. No. 7,930,232, which was a continuation of U.S. application Ser. No. 11/750,709, filed May 18, 2007 now U.S. Pat. No. 7,555,454, which was a continuation of U.S. application Ser. No. 09/641,589, filed Aug. 18, 2000 now U.S. Pat. No. 7,236,953. The disclosures of the prior applications are incorporated in their entirety by reference in the disclosure of this application.

BACKGROUND

This invention relates to generating and providing information about expected future prices of assets.

Among the kinds of information available at web sites on the Internet are current and historical prices and volumes of stock transactions, prices of put or call options at specific strike prices and expiration dates for various stocks, and theoretical prices of put and call options that are derived using formulas such as the Black-Scholes formula. Some web sites give predictions by individual experts of the future prices or price ranges of specific stocks.

A call option gives the holder a right to buy an underlying marketable asset by an expiration date for a specified strike price. A put option gives an analogous right to sell an asset. Options are called derivative securities because they derive their values from the prices of the underlying assets. Examples of underlying assets are corporate stock, commodity stock, and currency. The price of an option is sometimes called the premium.

People who buy and sell options are naturally interested in what appropriate prices might be for the options. One well-known formula for determining the prices for call and put options under idealized conditions is called the Black-Scholes formula. Black-Scholes provides an estimate of call or put prices for options having a defined expiration date, given a current price of the underlying asset, an interest rate, and the volatility rate (sometimes simply called volatility) of the asset. Black-Scholes assumes constant interest rates and volatility, no arbitrage, and trading that is continuous over a specified price range.

SUMMARY

In general, in one aspect, the invention features a method in which data is received that represents current prices of options on a given asset. An estimate is derived from the data of a corresponding implied probability distribution of the price of the asset at a future time. Information about the probability distribution is made available within a time frame that is useful to investors, for example, promptly after the current option price information becomes available.

Implementations of the invention may include one or more of the following features. The data may represent a finite number of prices of options at spaced-apart strike prices of the asset. A set of first differences may be calculated of the finite number of prices to form an estimate of the cumulative probability distribution of the price of the asset at a future time. A set of second differences may be calculated of the finite number of strike prices from the set of first differences to form the estimate of the probability distribution function of the price of the asset at a future time.

In general, in another aspect, the invention features a method in which a real time data feed is provided that contains information based on the probability distribution.

In general, in another aspect, the invention features a method that includes providing a graphical user interface for viewing pages containing financial information related to an asset; and when a user indicates an asset of interest, displaying probability information related to the price of the asset at a future time.

In general, in another aspect, the invention features a method that includes receiving data representing current prices of options on a given asset, the options being associated with spaced-apart strike prices of the asset at a future time. The data includes shifted current prices of options resulting from a shifted underlying price of the asset, the amount by which the asset price has shifted being different from the amount by which the strike prices are spaced apart. An estimate is derived from a quantized implied probability distribution of the price of the asset at a future time, the elements of the quantized probability distribution being more finely spaced than for a probability distribution derived without the shifted current price data.

In general, in another aspect, the invention includes deriving from said data an estimate of an implied probability distribution of the price of the asset at a future time, the mathematical derivation including a smoothing operation.

Implementations of the invention may include one or more of the following features. The smoothing operation may be performed in a volatility domain.

In general, in another aspect, the invention includes deriving a volatility for each of the future dates in accordance with a predetermined option pricing formula that links option prices with strike prices of the asset; and generating a smoothed and extrapolated volatility function.

Implementations of the invention may include one or more of the following features. The volatility function may be extrapolated to a wider range of dates than the future dates and to other strike prices. The smoothed volatility function may be applicable to conditions in which the data is reliable under a predetermined measure of reliability. The implied volatility function formula may have a quadratic form with two variables representing a strike price and an expiration date. The coefficients of the implied volatility function formula may be determined by applying regression analysis to approximately fit the implied volatility function formula to each of the implied volatilities.

In general, in another aspect, the invention features a method that includes receiving data representing current prices of options on assets belonging to a portfolio, deriving from the data an estimate of an implied multivariate distribution of the price of a quantity at a future time that depends on the assets belonging to the portfolio, and making information about the probability distribution available within a time frame that is useful to investors.

In general, in another aspect, the invention features a method that includes receiving data representing values of a set of factors that influence a composite value, deriving from the data an estimate of an implied multivariate distribution of the price of a quantity at a future time that depends on assets belonging to a portfolio, and making information about the probability distribution available within a time frame that is useful to investors.

Implementations of the invention may include one or more of the following features. The mathematical derivation may include generating a multivariate probability distribution function based on a correlation among the factors.

In general, in another aspect, the invention features a graphical user interface that includes a user interface element adapted to enable a user to indicate a future time, a user interface element adapted to show a current price of an asset, and a user interface element adapted to show the probability distribution of the price of the asset at the future time.

In general, in one aspect, the invention features, a method that includes continually generating current data that contains probability distributions of prices of assets at future times, continually feeding the current data to a recipient electronically, and the recipient using the fed data for services provided to users.

In general, in another aspect, the invention features a method that includes receiving data representing current prices of options on assets belonging to a portfolio, receiving data representing current prices of market transactions associated with a second portfolio of assets, and providing information electronically on the probability that the second portfolio of assets will reach a first value given the condition that the first portfolio of assets reaches a specified price at a future time.

In general, in another aspect, the invention features a method that includes receiving data representative of actual market transactions associated with a first portfolio of assets; receiving data representative of actual market transactions associated with a second portfolio of assets; and providing information on the expectation value of the price of first portfolio of assets given the condition that the second portfolio of assets reach a first specified price at a specified future time through a network.

In general, in another aspect, the invention features a method that includes evaluating an event defined by a first multivariate expression that represents a combination of macroeconomic variables at a time T, and estimating (e.g., using Monte Carlo techniques) the probability that a second multivariate expression that represents a combination of values of assets of a portfolio will have a value greater than a constant B at time T if the value of the first multivariate expression is greater than a constant A. The market variables represented by the first multivariate expression can include macroeconomic factors (such as interest rates), market preferences regarding the style of company fundamentals (large/small companies, rapid/steady growth, etc.), or market preferences for industry sectors.

In general, in another aspect, the invention features a method that includes defining a regression expression that relates the value of one variable representing a combination of macroeconomic variables at time T to a second variable at time T that represents a combination of assets of a portfolio, and estimating the probability that the second variable will have a value greater than a constant B at time T if the value of the first variable is greater than a constant A at time T, based on the ratio of the probability of x being greater than A under the regression expression and the probability of x being greater than A.

In general, in another aspect, the invention features a method that includes defining a current value of an option as a quadratic expression that depends on the difference between the current price of the option and the current price of the underlying security, and using Monte Carlo techniques to estimate a probability distribution of the value at a future time T of a portfolio that includes the option.

The invention takes advantage of the realization that option prices for a given underlying asset are indicative of the market's prediction of the of the risk-neutral price of the underlying asset in the future (e.g., at the expiration of the option). Option price data may be used to derive the market's prediction in the form of an implied probability distribution of future risk-neutral prices. Additional explanation of the significance of the phrase risk-neutral is contained in the Appendix.

The implied probability distribution and other information related to it may be made easily available to people for whom the information may be useful, such as those considering an investment in the underlying asset, or a brokerage firm advising such an investor.

Among the advantages of the invention are one or more of the following: Investors and prospective investors in an underlying asset, such as a publicly-traded stock, are given access to a key additional piece of current information, namely calculated data representing the market's view of the future price of the stock. Brokerage firms, investment advisors, and other companies involved in the securities markets are able to provide the information or related services to their clients and customers.

Other features and advantages will become apparent from the following description and from the claims.

DESCRIPTION

Details of implementations of the invention are set forth in the figures and the related description below.

FIGS. 1, 2, and 3 are graphs.

FIG. 4 is a block diagram.

FIGS. 5, 6, and 7 are web pages.

Figure 1:
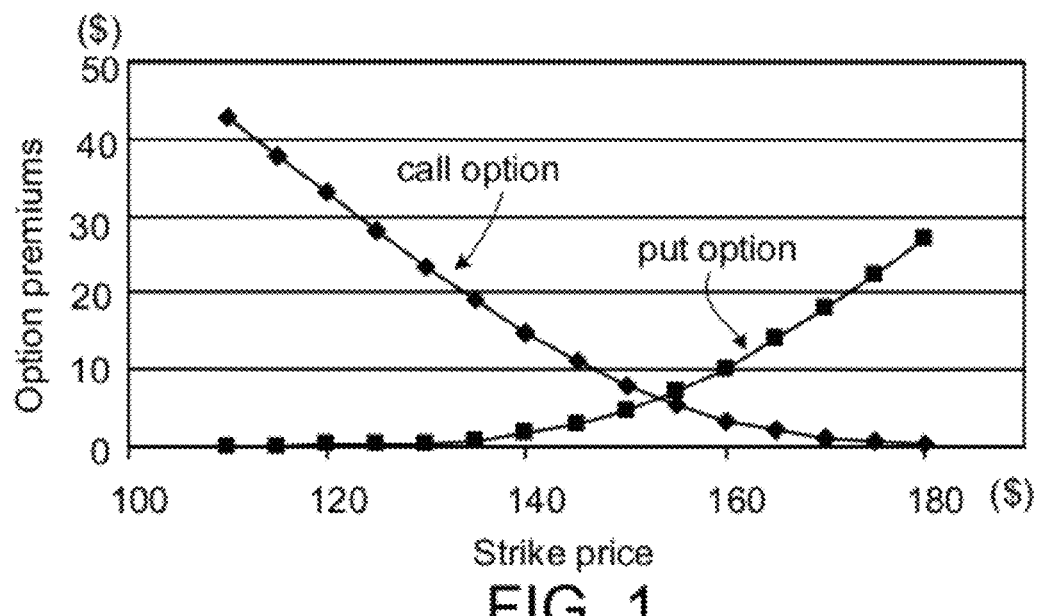

In general, the price of a call or put option is determined by buyers and sellers in the option market and carries information about the market's prediction of the expected price of the underlying asset at the expiration date. (The information does not include the premium that investors require for bearing risk, which must be estimated separately. The average long-term value of the risk premium is about 6% per year for all stocks and may be adjusted for an individual stock's historical responsiveness to broader market movements.)

The information carried in the prices of options having various strike prices and expirations is used to derive probability distributions of the asset's price at future times and to display corresponding information to investors, for example, on the World Wide Web.

Basic Method

We first define some relevant terms. We define x as the strike price, $c(x)$ as the theoretical call price function (the price of the call as a function of strike price), $p(x)$ as the theoretical put price function, $F(x)$ as the cumulative distribution function (cdf) of the price of the underlying asset at expiration; and $f(x)$ as the probability density function (pdf) of the asset price at expiration. By definition, $f(x)=F'(x)$ (i.e., the probability density function is the derivative of the cumulative distribution function).

The relationship between $c(x)$, $p(x)$, $f(x)$, and $F(x)$ can be succinctly stated as:

$$F(x)=c'(x)+1=p'(x); \qquad (1a)$$

$$f(x)=c''(x)=p''(x). \qquad (1b)$$

In words, the pdf is the second derivative of either the call price function or of the put price function A simple proof these relationships is given in the Appendix. The Appendix also contains other detailed information relating to the features of the invention.

This so-called "second-derivative method" for computing implied probability distributions from option price data is known in the academic literature, but apparently not very well known. For example, the standard textbook "Options, Futures, and Other Derivatives," by John C. Hull (Fourth Edition, 1999; Prentice-Hall) mentions implied probabilities, but not the second-derivative method. Perhaps the best reference that we have been able to find is J. C. Jackwerth and M. Rubinstein, "Recovering probability distributions from option prices," J. Finance, vol. 51, pp. 1611-1631 (1996), which has only six prior references. This paper cites D. T. Breeden and R. H. Litzenberger, "Prices of state-contingent claims implicit in option prices," J. Business, vol. 51, pp. 631-650 (1978) as the originator of a second-derivative method, although the latter paper nowhere mentions probabilities.

Approximating $f(x)$ from Finite Bid and Ask Option Prices

Equations (1a) and (1b) are obtained by assuming that the variable x is continuous and ranges from 0 to infinity. In practice, options are usually traded within certain price ranges and only for certain price intervals (e.g., ranging from $110 to $180 at $5 intervals). Thus, the call and/or put option prices are known only for a finite subset of strike prices. Under such circumstances, estimates of Equations (1a) and (1b) can be computed by taking differences instead of derivatives as follows.

We assume that the option prices c(x) and p(x) are quoted for a finite subset of equally-spaced strike prices x=nΔ, where n is an integer, and Δ is the spacing between quoted prices. Define $c_n = c(n\Delta)$, $p_n = p(n\Delta)$. Then the first derivatives c'(x) and p'(x) at x=(n+½)Δ may be estimated by the first differences:

$$\hat{c}'_{n+1/2} = \frac{c_{n+1} - c_n}{\Delta}; \quad (7a)$$

$$\hat{p}'_{n+1/2} = \frac{p_{n+1} - p_n}{\Delta}. \quad (7b)$$

The corresponding estimates of the cumulative distribution function:

$\hat{F}_{n+1/2} = F((n+\frac{1}{2})\Delta)$ are $$\hat{F}_{n+1/2} = 1 + \hat{c}'_{n+1/2} \quad (8a)$$

$$\hat{F}_{n+1/2} = \hat{p}'_{n+1/2} \quad (8b)$$

The second derivatives c''(x) and p''(x) at x=nΔ may likewise be estimated by the second differences, i.e., differences of the estimates of the first derivatives:

$$\hat{c}''_n = \frac{c'_{n+1/2} - c'_{n-1/2}}{\Delta} = \frac{c_{n+1} - 2c_n + c_{n-1}}{\Delta^2}; \quad (9a)$$

$$\hat{p}''_n = \frac{p_{n+1} - 2p_n + p_{n-1}}{\Delta^2}. \quad (9b)$$

Either of these estimates of the second derivatives may be used as an estimate of the probability density values at x=nΔ, i.e., $f(n\Delta)$:

$$\hat{f}_n = \hat{p}''_n \text{ or } \hat{f}_n = \hat{c}''_n \quad (10)$$

Figure 2:
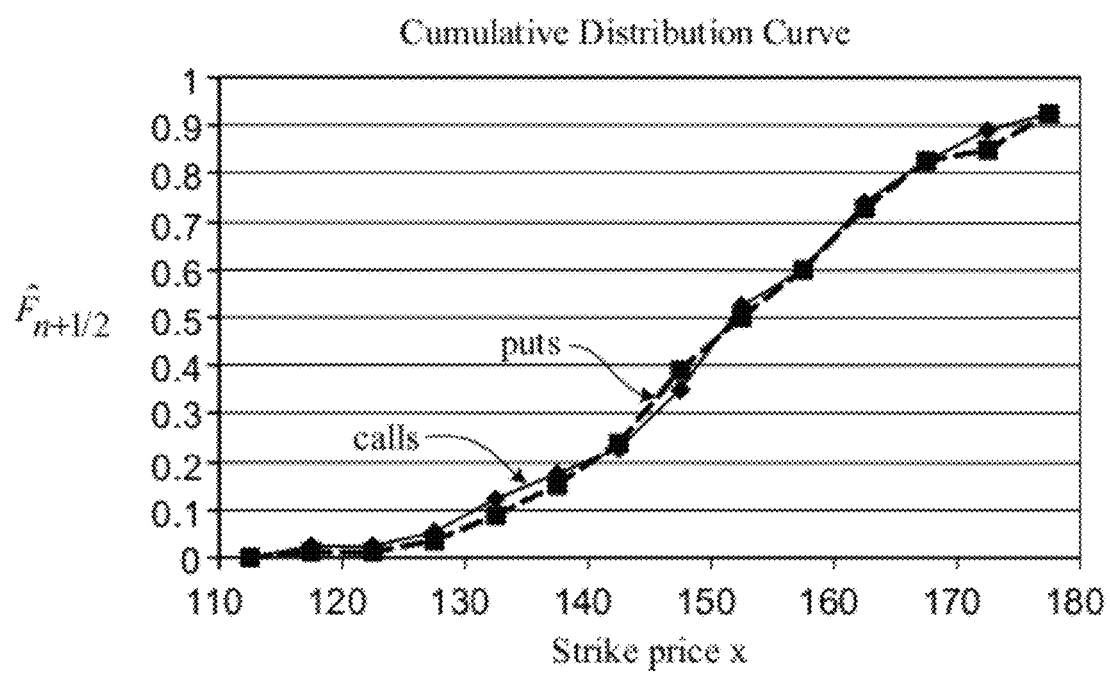
Figure 3:
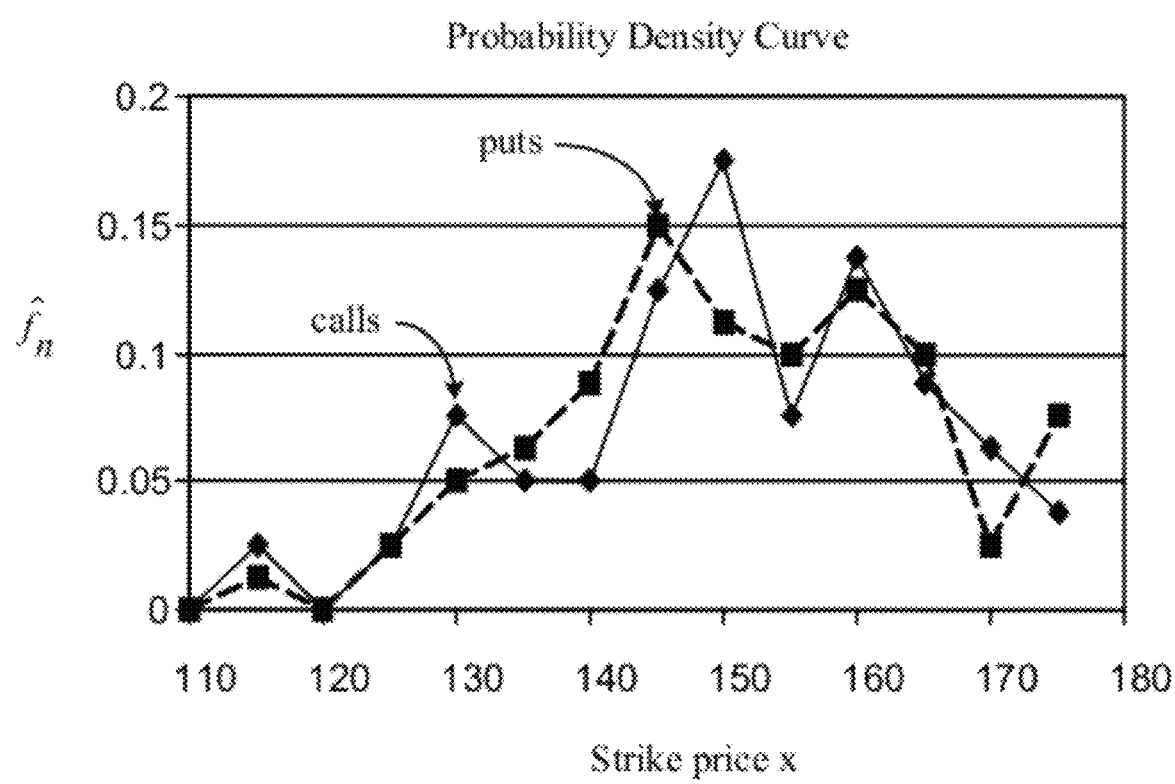

Moreover, the market prices of call and put options are usually given in terms of a bid-ask spread, and thus either the bid price or the ask price (or some intermediate value) may be used as the call or put option price. By using the bid and ask prices for both the call option and the put option, four estimates of F(x) and $f(x)$ may be obtained. These estimates may be combined according to their reliability in any desired way. For example, one might use the estimate derived from the put bid price curve for values of x less than the current price s of the underlying asset, and the estimate derived from the call bid price curve for values of x greater than s. Examples of $c_n$, $p_n$, $\hat{F}_{n+1/2}$, and $\hat{f}_n$ are shown in FIGS. 1, 2, and 3 using the data of TABLE 1 (see below).

Tabular Data

TABLE 1 below shows sample bid prices of call and put options for strike prices of an asset ranging from $110 to $180 at $5 intervals and the cumulative distribution values $\hat{F}_{n+1/2}$ and probability density values $\hat{f}_n$ computed according to Equations (7)-(10) above.

In the table, the values for $\hat{F}_{n+1/2}$ correspond to strike prices that are mid-way between the two strike prices used to compute $\hat{F}_{n+1/2}$. Thus, the cumulative distribution value shown to the right of the strike price $110 actually corresponds to the strike price $112.5, and the value to the right of the strike price $115 actually corresponds to strike price $117.5, and so forth.

| Strike price | Call price | $\hat{F}_{n+1/2}$ from call price | $\hat{f}_n$ from call price | Put price | $\hat{F}_{n+1/2}$ from put price | $\hat{f}_n$ from put price |
|---|---|---|---|---|---|---|
| 110 | 42 7/8 | 0 | 0 | 1/8 | 0 | 0 |
| 115 | 37 7/8 | 0.025 | 0.025 | 1/8 | 0.0125 | 0.0125 |
| 120 | 33 | 0.025 | 0 | 3/16 | 0.0125 | 0 |
| 125 | 28 1/8 | 0.05 | 0.025 | 1/4 | 0.0375 | 0.025 |
| 130 | 23 3/8 | 0.125 | 0.075 | 7/16 | 0.0875 | 0.05 |
| 135 | 19 | 0.175 | 0.05 | 7/8 | 0.15 | 0.0625 |
| 140 | 14 7/8 | 0.225 | 0.05 | 1 5/8 | 0.2375 | 0.0875 |
| 145 | 11 | 0.35 | 0.125 | 2 13/16 | 0.3875 | 0.15 |
| 150 | 7 3/4 | 0.525 | 0.175 | 4 3/4 | 0.5 | 0.1125 |
| 155 | 5 3/8 | 0.6 | 0.075 | 7 1/4 | 0.6 | 0.1 |
| 160 | 3 3/8 | 0.7375 | 0.1375 | 10 1/4 | 0.725 | 0.125 |
| 165 | 2 1/16 | 0.825 | 0.0875 | 13 7/8 | 0.825 | 0.1 |
| 170 | 1 3/16 | 0.8875 | 0.0625 | 18 | 0.85 | 0.025 |
| 175 | 5/8 | 0.925 | 0.0375 | 22 1/4 | 0.925 | 0.075 |
| 180 | 1/4 | | | 26 7/8 | | |

Dynamic Estimates for F(x) and $f(x)$.

In Equations (7)-(10), the call and put option prices were assumed to be static in the calculation of the cumulative distribution function F(x) and probability density function $f(x)$ for a finite subset of strike prices x=n Δ. In the real world, the price s of the underlying asset changes with time, and there will be a corresponding change in option prices. As a first order approximation, if the price s increases by a small amount δ, then the option price curves will effectively shift to the right by the amount δ. (Here, δ may be either positive or negative. For a more precise discussion of the shift, see the Appendix.) As a result, the price c(x) or p(x) now quoted at strike price x may be used as an estimate for the option price on the previous price curve at strike price x'=x−δ. As a result, the prices on the previous curve at a new discrete subset of strike prices x=nΔ−δ become effectively visible. Given enough movements of the underlying price, therefore, we can effectively compute estimates of c(x), p(x), F(x) and/or $f(x)$ for a subset of strike prices x that is much more closely spaced than the subset available at any one time.

Extrapolating and Smoothing Probability Distributions.

In a typical options market, the option prices are available only for certain expiration dates. In addition, the option prices are more reliable for options that are actively traded, which are typically nearer-term options at strike prices near the underlying price. It is therefore desirable to extrapolate and interpolate probability distributions to times other than actual expiration dates and to wider ranges of strike prices.

Any standard extrapolation and smoothing techniques may be used directly on the cumulative distribution values $\hat{F}_{n+1/2}$ or probability density values $\hat{f}_n$ to give a smoothed and extrapolated estimate of F(x) or $f(x)$. Similarly, given such estimated curves for a discrete subset of future times T, standard interpolation and extrapolation techniques may be used to estimate such curves for other specified values of T, or for a continuous range of T>0.

A less direct but useful approach is to perform extrapolation and smoothing on an implied volatility function, which is then used to calculate the other functions, such as c(x), p(x), F(x), and $f(x)$. The volatility rate of an asset (often simply called its volatility) is a measure of uncertainty about the returns provided by the asset. The volatility rates of a stock may typically be in the range of 0.3 to 0.5 per year.

An advantage of performing extrapolation and smoothing on implied volatility curves is that different types of volatility curves (so-called "volatility smiles") are known and can be used as a guide to the extrapolation and smoothing process to prevent "overfitting" of certain unreliable data points.

The standard method of computing implied volatilities is to invert the Black-Scholes pricing formula (see Appendix) for the actual call price c(x) or put price p(x) of an underlying asset at a given strike price x, given the underlying price s (current price of asset), risk-free rate of interest r, and T (expiration date). When this is done for a range of values of x, an estimate of an implied volatility curve σ(x) is obtained. This curve may be smoothed and extrapolated by any standard method to give a smoothed curve $\tilde{\sigma}(x)$. Then corresponding smoothed put and call price curves may be computed using the Black-Scholes pricing formula and differentiated once or twice to give a smoothed cdf or pdf. Finally, given such estimated curves for a discrete subset of future times T, standard interpolation and extrapolation techniques may be used to estimate such curves for other specified values of T, or for a continuous range of T>0.

Another new way to compute implied volatilities is first to compute a finite subset of cdf values $\hat{F}_{n+1/2}$ and then to invert the Black-Scholes cdf formula (see Appendix) at these values. When this is done for a range of values of x, an estimate of a generally different implied volatility curve $\sigma_1(x)$ is obtained, called the cdf-implied volatility curve. Again, this curve may be smoothed and extrapolated by any standard method to give a smoothed curve $\tilde{\sigma}_1(x)$. Then a corresponding smoothed cdf may be computed from the Black-Scholes cdf formula, and differentiated once to give a smoothed pdf. Finally, again, given such estimated curves for a discrete subset of future times T, standard interpolation and extrapolation techniques may be used to estimate such curves for other specified values of T, or for a continuous range of T>0.

Some advantages of using the cdf-implied volatility curve rather than the conventional implied volatility curve are that the computations are simpler, at least from an estimate of F(x), and that it fits better with the multivariate techniques to be discussed below.

A particular method for finding a smoothed and extrapolated implied volatility curve $\tilde{\sigma}_1(x,T)$ as a function of both strike price x and time T to expiration is as follows. The volatility curve is assumed to be approximated by a quadratic formula $$\tilde{\sigma}_1(x,T)=a_0+a_1x+a_2x^2 a_3T+a_4T^2+a_5xT, \quad (14)$$

The coefficients $\{a_i\}$ are determined by regression to fit the available data regarding $\sigma_1(x,T)$ as closely as possible. Given the smoothed curve $\tilde{\sigma}_1(x, T)$, corresponding smoothed cdfs for different x's and T's) may be computed from the Black-Scholes cdf formula for each time T, and differentiated once to give a smoothed pdf. An alternative procedure, with numerical advantages, is to use a quadratic fit like the above for a function $\tilde{\sigma}(x,T)$, and then invert the Black-Scholes cdf to find $\tilde{\sigma}_1(x,T)$. See the Appendix for the academic history of such approximations of $\tilde{\sigma}(x,T)$. Another useful variation is to fit $\tilde{\sigma}(x,T)$ with a quadratic function of x at times T which are specific expiration dates, then linearly interpolate at other times T.

Treatment of Multiple Assets

The techniques described so far give probability distributions for the future values of a single asset based on option price data for that asset. However, in many cases an investor may be concerned with multiple assets, for example all of the stocks in his or her portfolio, or in a mutual fund, or in a certain index. Moreover, the investor may be concerned with the relations between one group of assets and another.

A general method for dealing with such questions is to generate multivariate probability distributions for all assets of interest. A multivariate cdf may be written as $F(x_1, x_2, \ldots, x_n)$, where the variables $(x_1, x_2, \ldots, x_n)$ are the values of the n assets of interest.

We will assume that we know from the techniques described above or otherwise the marginal cdfs $F_i(x_i)$ for each of the individual variables. As a first step, we may define for each $x_i$ a function $y_i(x_i)$, called a "warping function," such that $y_i(x_i)$ is a standard normal (Gaussian) variable with mean 0 and variance 1. This is simply done by defining $y_i(x_i)$ such that $F_i(x_i)=N(y_i(x_i))$ for all values of x, where N(x) denotes the cdf of a standard normal variable. The function $y_i(x_i)$ may be simply described in terms of $\sigma_1(x_i)$. See the Appendix. Under mild technical conditions such as having a marginal cdf that varies monotonically, such a warping function $y_i(x_i)$ has a well-defined inverse warping function $x_i(y_i)$.

Second, we assume that we can find the historical pairwise correlations between the warped standard normal variables $y_i(x_i)$. These correlations may be computed by standard techniques from any available set of historical asset price data. We denote by C the n×n correlation matrix whose entries are these historically-based correlations. Because each of the variables $y_i(x_i)$ is standard normal, the diagonal terms of C are all equal to 1.

Now let $F_C(x_1, \ldots, x_n)$ denote the cdf of a multivariate Gaussian random n-tuple with zero mean and covariance matrix C. Define $$F(x_1, x_2, \ldots, x_n)=F_C(y_1(x_1), y_2(x_2), \ldots, y_n(x_n))$$

Then $F(x_1, x_2, \ldots, x_n)$ is a multivariate cdf that (a) has the correct (given) marginal cdfs $F_i(x_i)$; and (b) has the correct (historical) correlations between the warped standard normal variables $y_i(x_i)$. We use this cdf to answer questions involving the variables $(x_1, x_2, \ldots, x_n)$.

For example, the investor might have a portfolio consisting of a given quantity of each of these assets. The value of such a portfolio is the sum $$x = h_1 x_1 + h_2 x_2 + \ldots + h_n x_n, \quad (15)$$

where $h_i$ represents the quantity of the ith asset in the portfolio. The investor might be interested in an estimate of the probability distribution of the value x of the whole portfolio.

Such an estimate may be obtained by Monte Carlo simulation. For such a simulation, a large number N of samples from the multivariate Gaussian cdf $F_G(y_1, \ldots, y_n)$ may be generated. Each sample $(y_1, \ldots, y_n)$ may be converted to a sample $(x_1, x_2, \ldots, x_n)$ by using the inverse warping functions $x_i(y_i)$. The value x of the total portfolio may then be computed for each sample. From these N values of x, the probability distribution of x (e.g., its cdf $F(x)$) may be estimated.

In practice, it is useful to save the N multivariate samples in a large database. Then the cdf of any quantity whose value is a function of the variables $(x_1, x_2, \ldots, x_n)$ may be estimated from this database. For example, if the investor would like to know the cdf of some alternative portfolio with different quantities of each asset, this can be quickly determined from the stored database.

An investor may also determine the effect of one portfolio (or event(s) or variables such as interest rates, P/E ratios, public interest in a certain sector of the market) on another portfolio as follows. Assume that the first portfolio is represented by x, where $$x = h_1 x_1 + h_2 x_2 + \ldots + h_n x_n, \quad (30)$$

where each $x_i$ may be viewed as the price of a portfolio component, and the second portfolio is represented by y, where $$y = +g_1 x_1 + g_2 x_2 + \ldots + g_n x_n. \quad (31)$$

where each $y_i$ may be viewed as the price of a portfolio component or more broadly as any macro-economic variable (macroeconomic, fundamental, or sector related).

Consider the "what-if" question: letting A and B be given positive constants, if $x \geq A$ at time T, what is the probability that $y \geq B$ at time T. This question can be answered by creating a Monte Carlo database as above for the multivariate cdf $F(x_1, x_2, \ldots, x_n)$ corresponding to time T, identifying those samples for which $x \geq A$, and then using only these samples to estimate the probability that $y \geq B$. More generally, any conditional cdf of the form $F(x|E)$ can be estimated similarly, where x is any function of the variables $(x_1, x_2, \ldots, x_n)$ and E is any event defined in terms of the variables $(x_1, x_2, x_n)$.

Similarly, suppose an investor would like to know whether it is reasonable to believe that a certain stock or portfolio x will have a value greater than a given constant A at time T. This kind of question can be addressed by estimating the conditional cdf of some other related and perhaps better-understood variable (or combination of variables) y at time T, given that $x \geq A$. If the resulting distribution for y does not look reasonable, then the investor may conclude that it is unreasonable to expect that $x \geq A$.

Applications that Use the Probability Distribution Information

A wide variety of techniques may be used to accumulate and process the information needed for the calculations described above and to provide the information to users directly or indirectly through third parties. Some of these techniques are described below.

Figure 4:
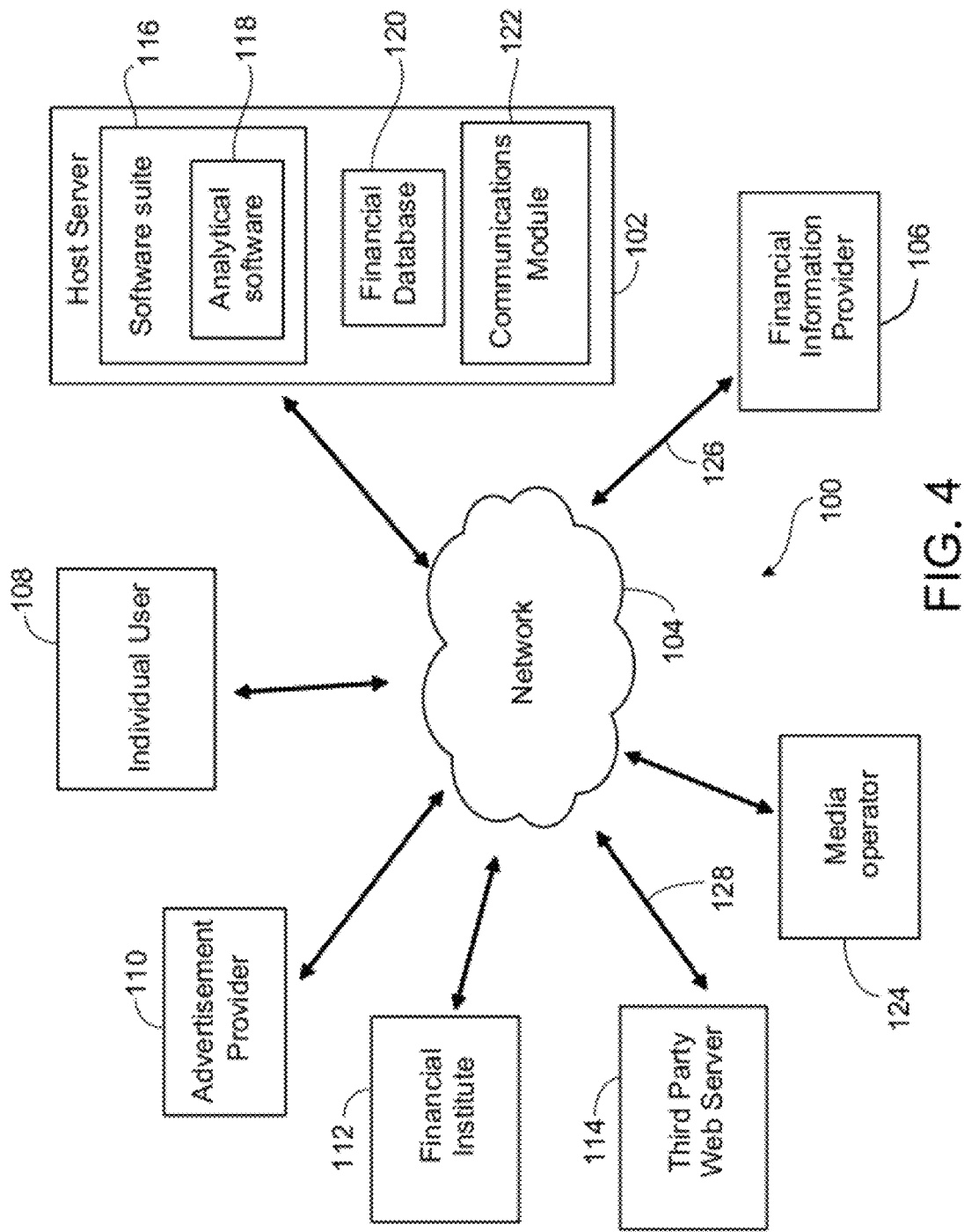

As shown in FIG. 4, the probability distribution information can be provided to users from a host server 102 connected to a communication network 104, for example, a public network such as the Internet or a private network such as a corporate intranet or local area network (LAN). For purpose of illustration, the following discussion assumes that network 104 is the Internet.

The host server 102 includes a software suite 116, a financial database 120, and a communications module 122. The communications module 122 transmits and receives data generated by the host server 102 according to the communication protocols of the network 104.

Also connected to the network are one or more of each of the following (only one is shown in each case): an individual or institutional user 108, an advertisement provider 110, a financial institution 112, a third party web server 114, a media operator 122, and a financial information provider 106.

The operator of the host server could be, for example, a financial information source, a private company, a vendor of investment services, or a consortium of companies that provides a centralized database of information.

The host server 102 runs typical operating system and web server programs that are part of the software suite 116. The web server programs allow the host server 102 to operate as a web server and generate web pages or elements of web pages, e.g., in HTML or XML code, that allow each user 108 to receive and interact with probability distribution information generated by the host server.

Software suite 116 also includes analytical software 118 that is configured to analyze data stored in the financial database 120 to generate, for example, the implied probability distribution of future prices of assets and portfolios.

The financial database 120 stores financial information collected from the financial information providers 106 and computation results generated by the analytical software 118. The financial information providers 106 is connected to the network 104 via a communication link 126 or the financial information providers may feed the information directly to the host server through a dialup or dedicated line (not shown).

FIG. 4 gives a functional view of an implementation of the invention. Structurally, the host server could be implemented as one or more web servers coupled to the network, one or more applications servers running the analytical software and other applications required for the system and one or more database servers that would store the financial database and other information required for the system.

Figure 10:
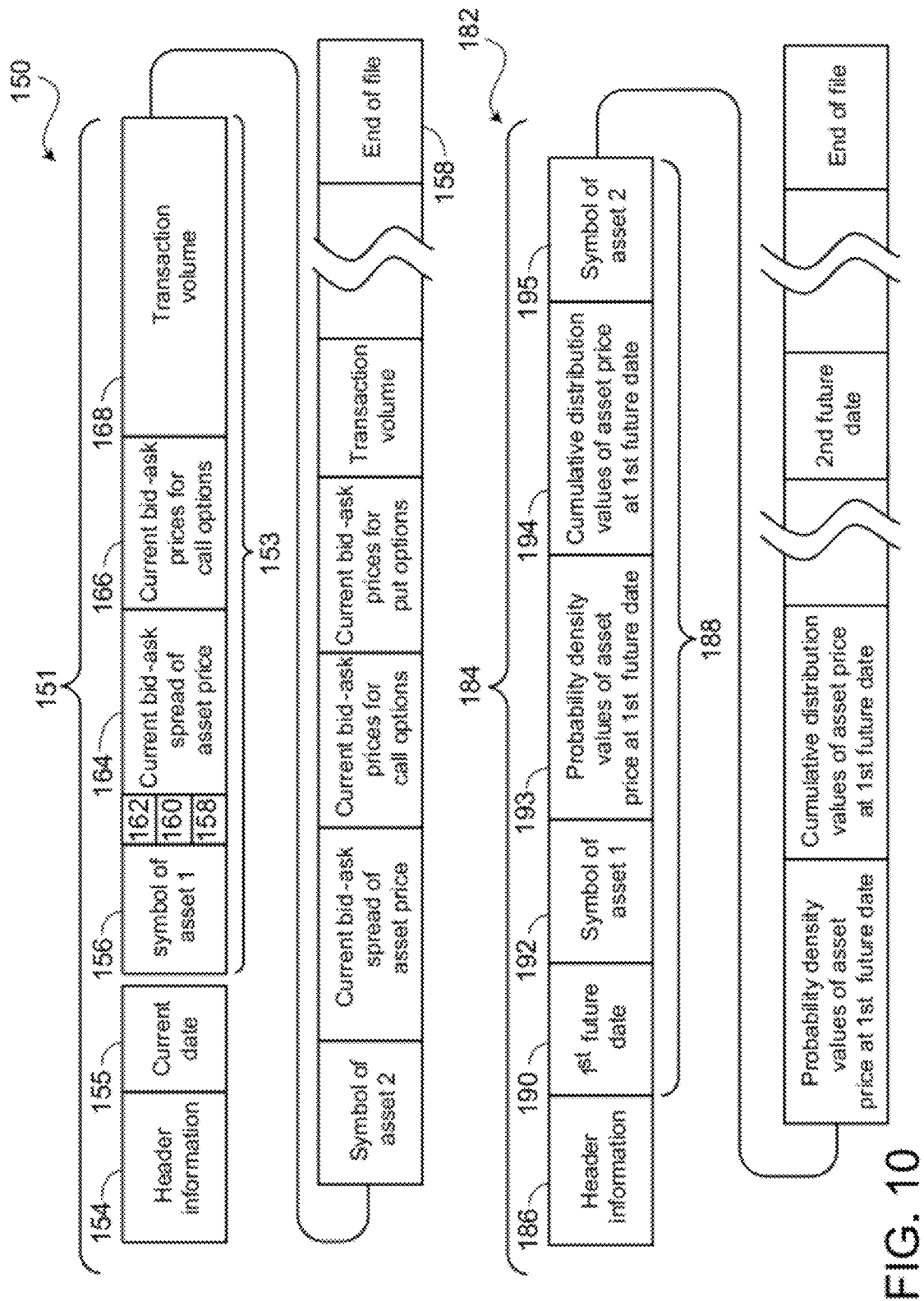
FIG. 10 shows data structures.

FIG. 10 shows an example of a data feed 150 sent from the financial information provider 106 to the host server 102 through the communication link 126. Information is communicated to the host server in the form of messages 151, 152. Each message contains a stream of one or more records 153 each of which carries information about option prices for an underlying asset. Each message includes header information 154 that identifies the sender and receiver, the current date 155, and an end of message indicator 158, which follows the records contained in the message.

Each record 153 in the stream includes an identifier 156 (e.g., the trading symbol) of an underlying asset, an indication 158 of whether the record pertains to a put or call, the strike date 160 of the put or call, the strike price 162 of the put or call, current bid-ask prices 164 of the underlying asset, bid-ask prices 166 for the option, and transaction volumes 168 associated with the option. The financial information provider 106 may be an information broker, such as Reuters, Bridge, or Bloomberg, or any other party that has access to or can generate the information carried in the messages. The broker may provide information from sources that include, for example, the New York Stock Exchange and the Chicago Board of Options Exchange.

The financial database 120 stores the information received in the information feed from the financial information providers and other information, including, for example, interest rates and volatilities. The financial database also stores the results generated by the analytical software, including probability distribution functions with respect to the underlying assets and assets that are not the subject of options.

The probability distribution information is generated continually (and essentially in real time) from the incoming options data so that the information provided and displayed to users is current. That is, the information is not based on old historical data but rather on current information about option prices.

In addition, other soft information can be accumulated, stored, and provided to users, including fundamental characteristics of the underlying assets, including prices, volatility values, beta, the identification of the industry to which the asset belongs, the yield, the price to book ratio, and the leverage. Other information could include calendars of earnings forecast dates, earnings forecasts, corporate action items, news items that relate to an industry, and the volume of institutional holdings.

The messages from the information provider 106 may be sent in response to requests by the host server 102, the information may be sent to the host server 102 automatically at a specified time interval, or the information may be sent as received by the information provider from its sources. The financial database 120 may be maintained on a separate server computer (not shown) that is dedicated to the collection and organization of financial data. The financial database is organized to provide logical relationships among the stored data and to make retrieval of needed information rapid and effective.

The user 108 may use, for example, a personal computer, a TV set top box, a personal digital assistant (PDA), or a portable phone to communicate with the network 104. Any of these devices may be running an Internet browser to display the graphical user interface (GUI) generated by the host server 102.

The host server 102 may provide probability distribution information on the network 104 in the form of web pages and allow the individual user 108, the financial institution 112, the third party web server 114, and the media operator 124 to view the information freely. The host company that runs the host server 102 may generate revenue by, for example, selling advertisement space on its web pages to an advertisement provider 110. The host server 102 may also provide proprietary information and enhanced services to individual users 108, financial institutions 112, third party web servers 114, and media operators 122 for a subscription fee.

The host server 102 may have a direct link to the financial institutions 112 to provide tailored information in a format that can be readily incorporated into the databases of the financial institutions 112. Financial institutions 112 may include, for example, investment banks, stock brokerage firms, mutual fund providers, bank trust departments, investment advisers, and venture capital investment firms. These institutions may incorporate the probability distribution information generated by the analytical software 118 into the financial services that they provide to their own subscribers. The probability distribution information provided by the host server 102 enables the stock brokerage firms to provide better advice to their customers.

A third party web server 114 may incorporate probability distribution information into its web site. The information may be delivered in the form of an information feed to the third party host of web server 114 either through the Internet or through a dedicated or dial-up connection.

FIG. 10 shows an example of a data feed 182 sent from the host server 102 to the third party web server 114 through communication link 128. Data feed 182 carries messages 184 that include header information 186, identifying the sender and receiver, and records 188 that relate to specific underlying assets.

Each record 188 includes an item 190 that identifies a future date, a symbol 192 identifying the asset, risk-neutral probability density information 193 and cumulative distribution information 194. The record could also include a symbol identifying a second asset 195 with respect to the identified future date, and so on. Other information could be provided such as a risk premium value with respect to the risk-neutral values.

Examples of third party web servers 114 are the web servers of E*TRADE, CBS MarketWatch, Fidelity Investments, and The Wall Street Journal. The third party web server 114 specifies a list of assets for which it needs probability distribution information. Host server 102 periodically gathers information from financial information provider 106 and its own financial database 120, generates the probability distribution information for the specified list of assets, and transmits the information to the third party web server 114 for incorporation into its web pages.

Examples of the media operator 124 are cable TV operators and newspaper agencies that provide financial information. For example, a cable TV channel that provides stock price quotes may also provide probability distribution information generated by the host server 102. A cable TV operator may have a database that stores the probability distributions of all the stocks that are listed on the NYSE for a number of months into the future. The host server 102 may periodically send updated information to the database of the cable TV operator. When a subscriber of the cable TV channel views the stock price quotes on a TV, the subscriber may send commands to a server computer to the cable TV operator via modem to specify a particular stock and a particular future date. In response, the server computer of the cable TV operator retrieves the probability distribution information from its database and sends the information to the subscriber via the cable network, e.g., by encoding the probability distribution information in the vertical blank interval of the TV signal.

Likewise, a newspaper agency that provides daily transaction price quotes may also provide the probabilities of stock prices rising above certain percentages of the current asset prices at a predetermined future date, e.g., 6 months. A sample listing on a newspaper may be "AMD 83 88 85 ▲40%", meaning that the AMD stock has a lowest price of $83, highest price of $88, a closing price of $85 that is higher than the previous closing price, and a 40% probability of rising 10% in 6 months.

The analytical software 118 may be written in any computer language such as Java, C, C++, or FORTRAN. The software may include the following modules: (1) input module for preprocessing data received from the financial data sources; (2) computation module for performing the mathematical analyses; (3) user interface module for generating a graphical interface to receive inputs from the user and to display charts and graphs of the computation results; and (4) communications interface module for handling the communications protocols required for accessing the networks.

Web Pages and User Interfaces

A variety of web pages and user interfaces can be used to convey the information generated by the techniques described above.

Figure 5:
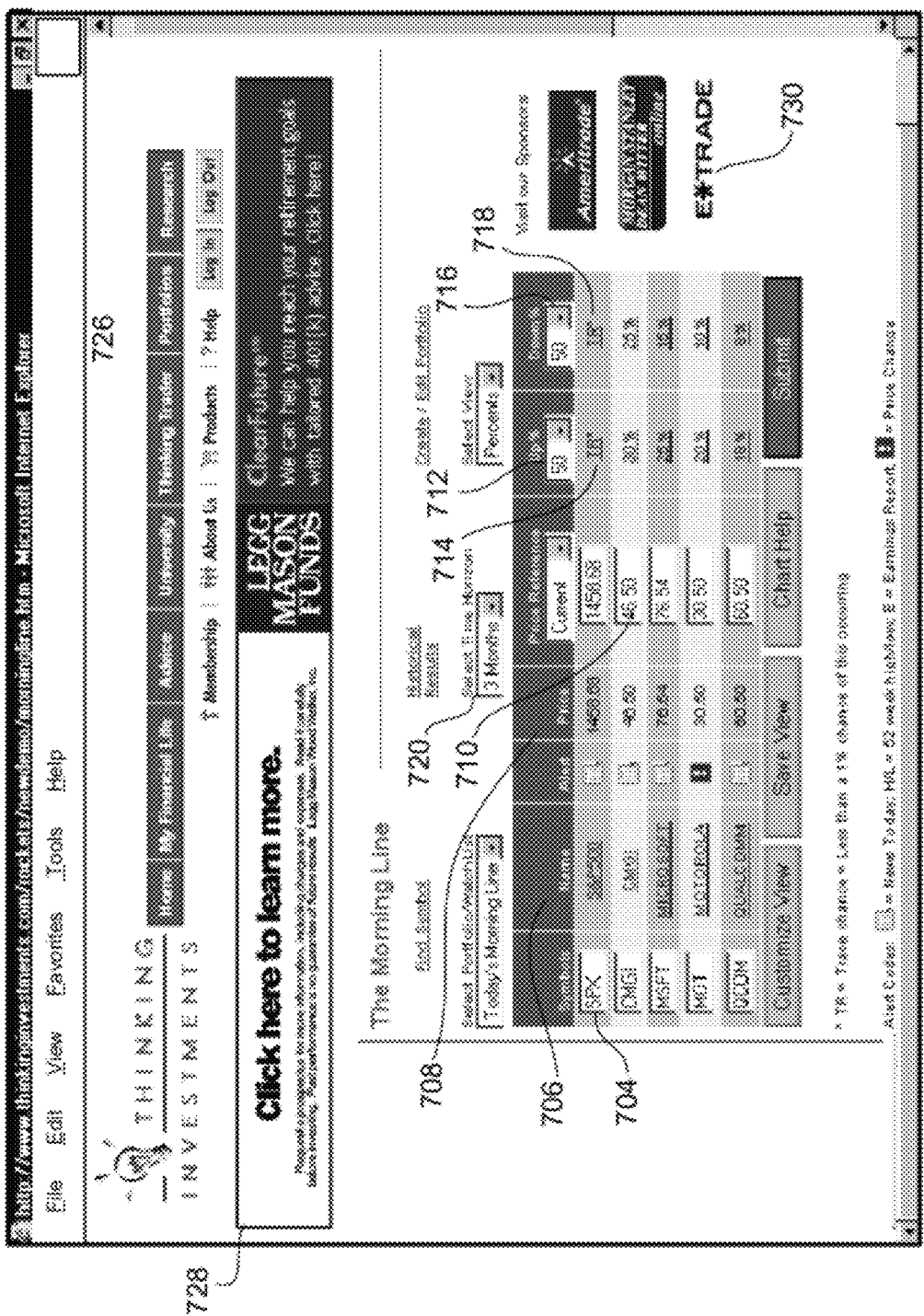

For example, referring to FIG. 5, a GUI 700 enables a user 108 to obtain a range of financial services provided by the host server 102. The user 108 may see the implied probabilities of future prices of marketable assets 706 having symbols 704 and current prices 708. The information displayed could include the probabilities 714 (or 718) of the asset prices rising above a certain specified percentage 712 (or falling below a certain specified percentage 716) of the reference price 710 within a specified period of time 720.

For the convenience of the user 108, GUI 700 includes links 730 to institutions that facilitate trading of the assets. The host company that runs the host server 102 sells advertising space 728 on the GUI 700 to obtain revenue. The GUI 700 also has links 726 to other services provided by the host server 102, including providing advice on lifetime financial management, on-line courses on topics related to trading of marketable assets, research on market conditions related to marketable assets, and management of portfolios of assets.

Figure 6:
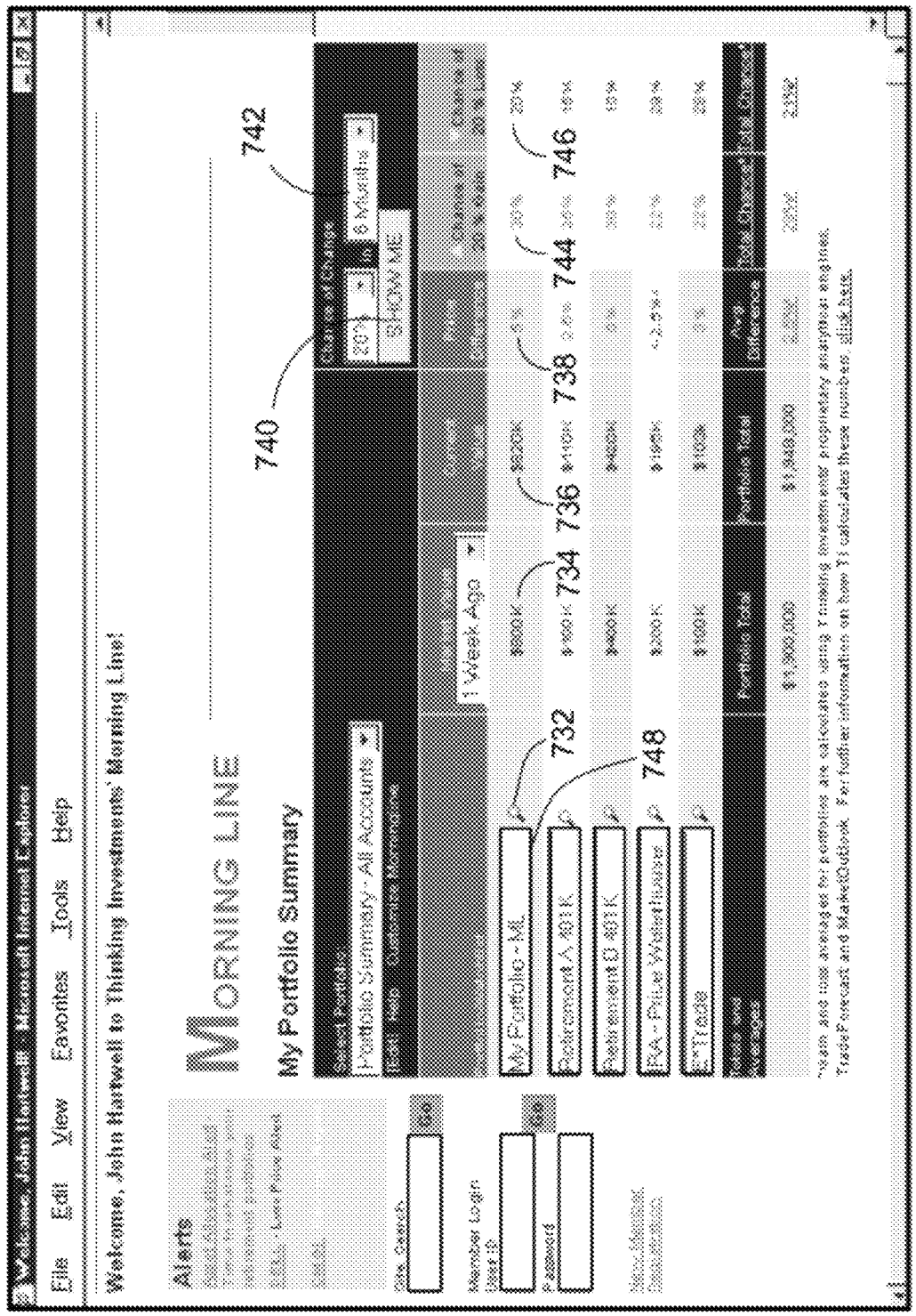

Referring to FIG. 6, the GUI 700 also may display an interactive web page to allow the user 108 to view the market's current prediction of future values of portfolios of assets. The past market price 734 and current market price 736 of the asset portfolios 732 are displayed. Also displayed is the price difference 738. The GUI 700 displays the probability 744 (or 746) that the portfolio 732 will gain (or lose) a certain percentage 740 within a specified time period 742. Examples of portfolios include stock portfolios, retirement 401K plans, and individual retirement accounts. Links 748 are provided to allow the user 108 to view the market's current forecast of future price trends of the individual assets within each portfolio.

Figure 7:
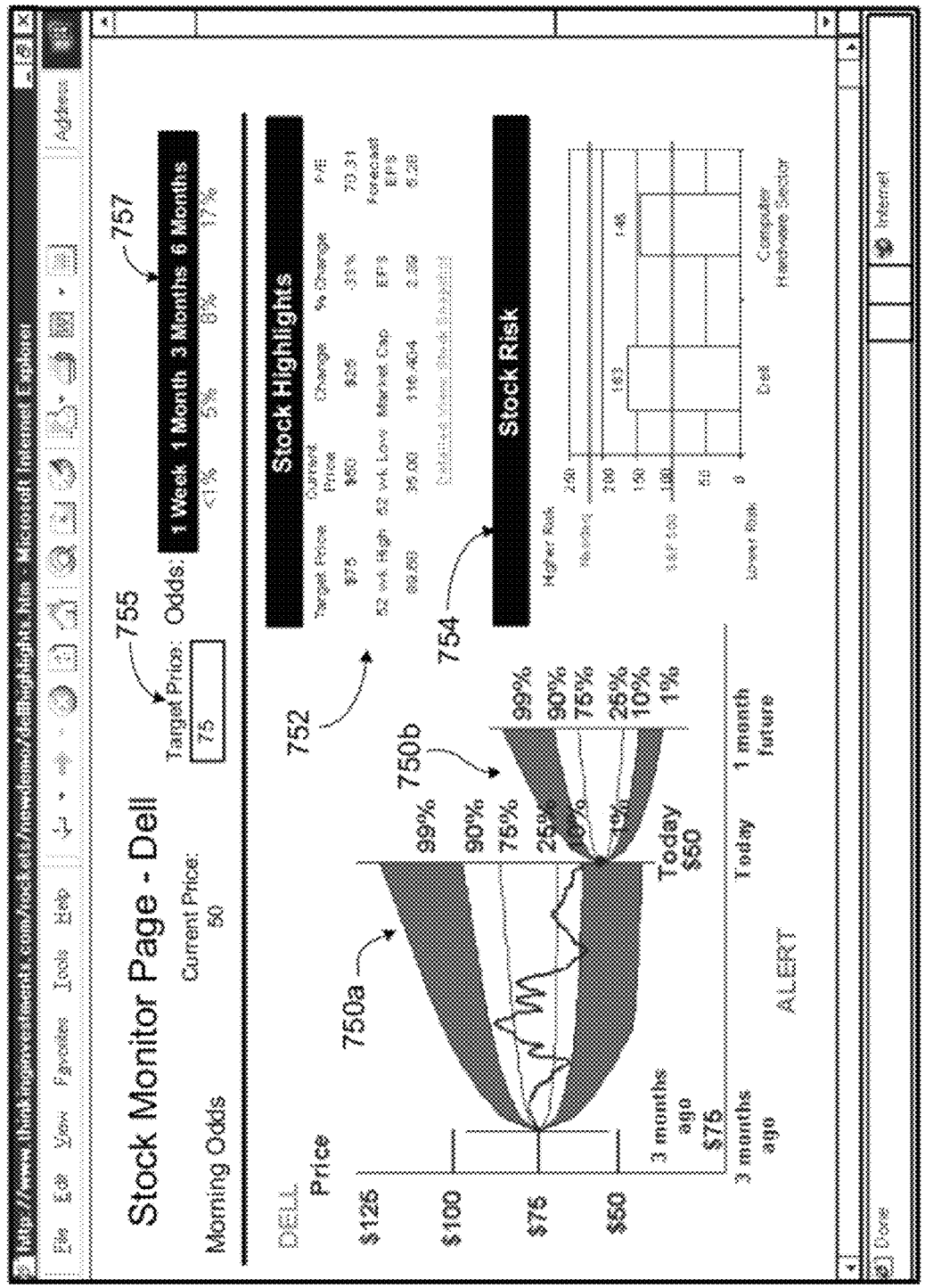

Referring to FIG. 7, in another user interface, the GUI 700 displays an interactive web page that includes detailed analyses of past price history and the market's current forecast of the probability distribution of the future values of a marketable asset over a specified period of time. The GUI 700 includes price-spread displays 750 representing the cumulative distribution values of the predicted future prices of an asset over periods of time. The price-spread display 750a shows the price distribution data that was generated at a time three months earlier. A three-month history of the actual asset prices is shown as a line graph for comparison to give the user 108 a measure of the merit of the price distribution information. The price-spread display 750b represents the predicted cumulative distribution values of the asset prices over a period of one month into the future. The left edge of display 750b, of course, begins at the actual price of the asset as of the end of the prior three-month period, e.g., the current DELL stock price of $50. The probability distribution information implies, for example, a 1% probability that the stock price will fall below $35, and a 99% probably that the stock price will fall below $80 in one month. GUI 700 includes table 752 that shows highlights of asset information and graph 754 that shows sector risks of the asset. A box 755 permits a user to enter a target price and table 757 presents the probability of that price at four different future times, based on the calculated implied probability distributions.

Figure 8:
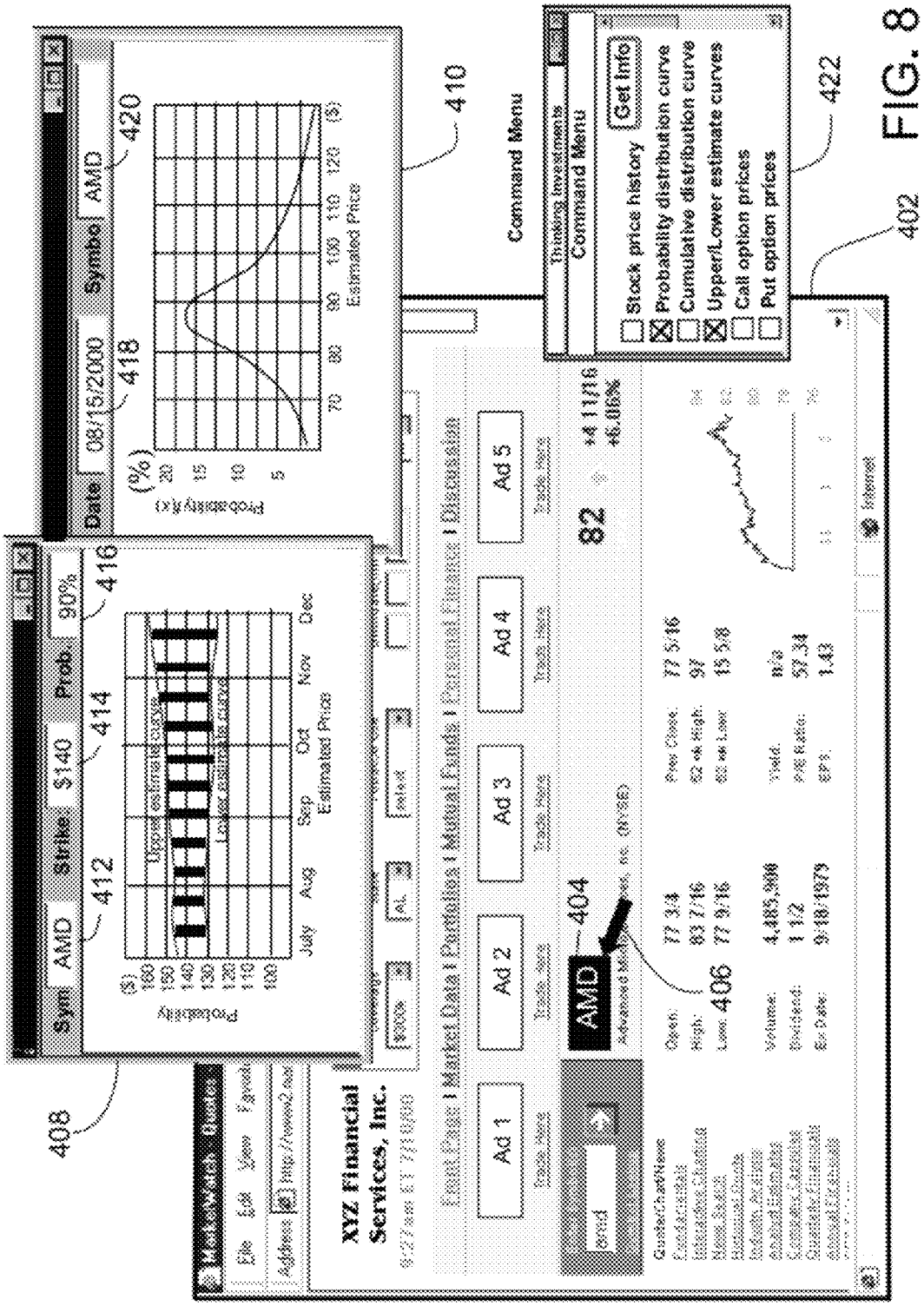
FIGS. 8 and 9 illustrate user interfaces.

Referring to FIG. 8, in another approach, a window 402 is displayed on a user's screen showing financial information along with two other windows 408 and 410 showing probability distribution information. The individual user 108 could have previously downloaded a client program from the host server 102. When the user is viewing any document, e.g., any web page (whether of the host server 102 or of another host's server), the user may highlight a stock symbol 404 using a pointer 406 and type a predetermined keystroke (e.g., "ALT-SHIFT-Q") to invoke the client program. The client program then sends the stock symbol as highlighted by the user to the host server 102. The host server 102 sends probability distribution information back to the client program, which in turn displays the information in separate windows 408 and 410.

When the client program is invoked, a window 422 may be displayed showing the different types of price information that can be displayed. In the example shown, the "Probability distribution curve" and "Upper/lower estimate curves" are selected. Window 408 shows the price range of AMD stock above and below a strike price of $140 from July to December, with 90% probability that the stock price will fall between the upper and lower estimate curves. Window 410 shows the probability density curve $f(x)$ for AMD stock for a future date of Aug. 15, 2000. The user may also specify a default function curve, such that whenever an asset name is highlighted, the default function curve is displayed without any further instruction from the user.

Tabular data such as those shown in TABLE 1 may be generated by the host server 102 and transmitted over the network 104 to devices that have limited capability for displaying graphical data. As an example, the individual user 108 may wish to access asset probability distribution information using a portable phone. The user enters commands using the phone keypad to specify a stock, a price, and a future date. In response, the host server 102 returns the probability of the stock reaching the specified price at the specified future date in tabular format suitable for display on the portable phone screen.

Figure 9:
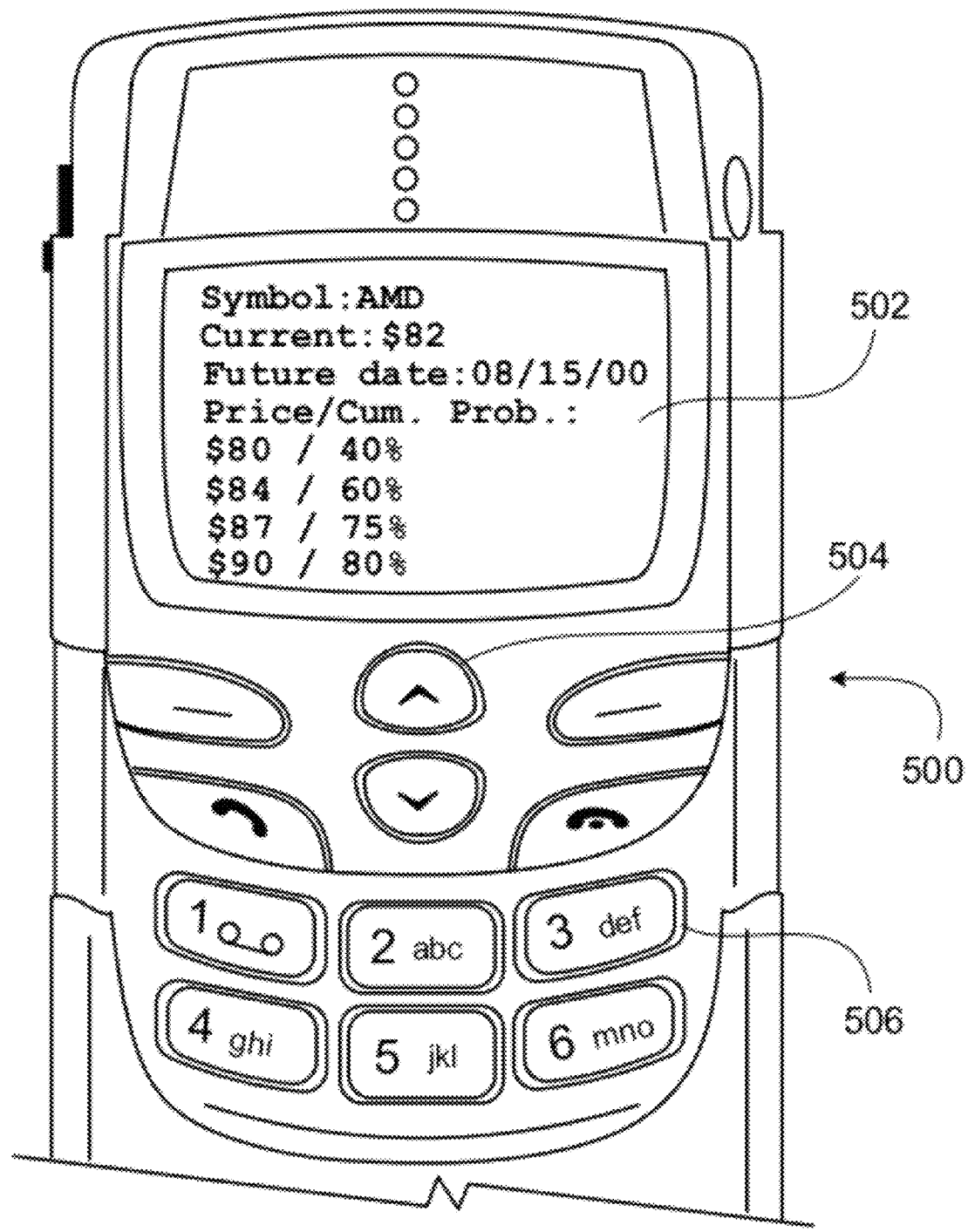

Referring to FIG. 9, a portable phone 500 includes a display screen 502, numeric keys 506, and scrolling keys 504. A user may enter commands using the numeric keys 506. Price information received from the host server 102 is displayed on the display screen 502. Tabular data typically includes a long list of numbers, and the user may use the scroll keys 504 to view different portions of the tabular data.

In the example shown in display screen 502, the AMD stock has a current price of $82. The cumulative distribution values $F(x)$ for various future prices on Aug. 15, 2000 are listed. The distribution indicates a 40% probability that the stock price will be below $80 implying a 60% probability of the stock price being above $80. Likewise, the distribution indicates an 80% probability that the stock price will be at least $90, implying a probability of 20% of the stock price being above $90.

Other embodiments are within the scope of the following claims.

The invention claimed is:

1. A method comprising
by machine, performing computations to determine a cumulative probability distribution function (cdf) for a price of an asset at a future time (T) based on prices of options on the asset, the options being at two or more strike prices x for the asset, the computations including:
determining a cumulative-distribution-function-implied volatility (CDF-implied volatility) of the asset as a function of the prices of the options by estimating a finite set of cdf values based on the prices of the options, and
for each of the estimated cdf values in the finite set, determining, as the CDF-implied volatility, a statistical measure for which probability of exercise of an option, as determined by an option pricing model, agrees with the estimated cdf value, for the time T and for an interpolated strike price corresponding to the estimated cdf value, given a current price of the asset, the determined CDF-implied volatilities representing an estimated curve of CDF-implied volatility as a function of the prices of options at the strike prices x.

2. The method of claim 1 comprising smoothing the estimated curve of CDF-implied volatility.

3. The method of claim 2 comprising estimating parameters in a parameterized smooth probability distribution, the parameters chosen to best fit, with the cdf of the parameterized distribution, the smoothed estimated curve of CDF-implied volatility.

4. The method of claim 1 comprising estimating parameters in a parametrized probability distribution, the parameters chosen to best fit, with the cdf of the parameterized distribution, the estimated curve of CDF-implied volatility.

5. The method of claim 2 comprising
computing a probability density function (pdf) by differentiating the smoothed CDF.

6. The method of claim 1 comprising
estimating CDF-implied volatility values at two or more future times T for which option prices are available, and interpolating and extrapolating associated variances to obtain interpolated and extrapolated values of the CDF that are implied at other future times.

7. The method of claim 1 in which the probability of exercise option, as determined by an option pricing model, is adjusted for risk aversion.

8. The method of claim 6 in which the adjustment for risk aversion comprises shifting the CDF values at a given price x to a higher price x by estimating stock returns in terms of a market return regression factor, together with standard long term estimates for market returns.

9. The method of claim 1 in which the estimated CDF values are for returns on a portfolio of assets, provided by Monte-Carlo calculations in a modeled multivariate distribution of joint returns on the assets.

10. The method of claim 1 in which the estimating of a finite set of cdf values comprises estimating by finite difference differentiation.

11. The method of claim 1 in which the statistical measure comprises a standard deviation.

12. The method of claim 11 in which the option pricing model assigns a probability of exercise at a future time based on a lognormal distribution determined by the standard deviation, adjusted for time to expiration, together with additional parameters available to an investor at a present time.

13. The method of claim 1, 11, or 12 in which the option pricing model comprises the Black-Scholes option pricing model.

* * * * *